United States Patent
Yoshida et al.

(10) Patent No.: US 7,363,530 B2
(45) Date of Patent: Apr. 22, 2008

(54) DATA RECORDING METHOD AND DATA RECORDING APPARATUS

(75) Inventors: Susumu Yoshida, Kawasaki (JP); Yukio Isobe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 11/045,719

(22) Filed: Jan. 27, 2005

(65) Prior Publication Data

US 2005/0131963 A1    Jun. 16, 2005

Related U.S. Application Data

(63) Continuation of application No. 10/090,707, filed on Mar. 4, 2002, now Pat. No. 6,883,111.

(30) Foreign Application Priority Data

Nov. 12, 2001 (JP) ............................. 2001-345528

(51) Int. Cl.
*G06F 11/00* (2006.01)
(52) U.S. Cl. .................... 714/5; 369/53.36; 369/53.15; 386/113
(58) Field of Classification Search ............. 369/53.36, 369/53.15–53.18, 44.33; 386/115, 113
See application file for complete search history.

(56) References Cited

U.S. PATENT DOCUMENTS

| 5,107,481 | A | * | 4/1992 | Miki et al. ................ 369/53.21 |
| 5,446,857 | A | * | 8/1995 | Russ .......................... 711/100 |
| 5,623,470 | A | * | 4/1997 | Asthana et al. ........... 369/47.49 |
| 5,687,397 | A | * | 11/1997 | Ohmori ........................ 710/73 |
| 5,940,853 | A | * | 8/1999 | Ooi et al. ..................... 711/111 |
| 6,115,342 | A | | 9/2000 | Kazuno et al. |
| 6,141,772 | A | * | 10/2000 | Hashimoto .................... 714/16 |
| 6,160,778 | A | * | 12/2000 | Ito et al. ................... 369/53.15 |
| 6,304,534 | B1 | * | 10/2001 | Ito et al. ................... 369/53.15 |

(Continued)

FOREIGN PATENT DOCUMENTS

JP    05-054518 A    3/1993

(Continued)

*Primary Examiner*—Christopher McCarthy
(74) *Attorney, Agent, or Firm*—Townsend and Townsend and Crew LLP

(57) ABSTRACT

The latest management data recorded in a recording medium is read. Then, it is judged whether the fault is in this latest management data or not. When it is judged the fault is not in this latest management data, a data size of user data under the management of this latest management data is compared with a data size of the user data recorded actually in the recording medium. In the judgment explained above, when the latest management data cannot be read, when it is judged the fault is in the latest management data or when it is judged a data size of user data under the management of the latest management data is not identical to a data size of the user data recorded actually in the recording medium, management data can be updated by analyzing the user data recorded in the recording medium. Thereby, there is provided a repair technique for the recorded data in response to an accidental shut-off condition of power supply in a data recording apparatus for recording user data and management data used for management of such user data to the recording medium.

20 Claims, 9 Drawing Sheets

U.S. PATENT DOCUMENTS

| | | | |
|---|---|---|---|
| 6,385,736 B1 | 5/2002 | Jeong et al. | |
| 6,469,963 B1* | 10/2002 | Sawada et al. | 369/47.1 |
| 6,567,349 B2* | 5/2003 | Nagata et al. | 369/30.07 |
| 6,658,588 B1* | 12/2003 | Ko | 714/5 |
| 6,674,697 B1 | 1/2004 | Ko | |
| 6,757,848 B2* | 6/2004 | Bartlett | 714/42 |
| 6,904,492 B2* | 6/2005 | Hogan | 711/102 |
| 7,062,156 B2* | 6/2006 | Nakatani et al. | 386/113 |
| 7,266,064 B2* | 9/2007 | Hwang et al. | 369/53.15 |
| 2001/0043525 A1 | 11/2001 | Ito et al. | |
| 2004/0028393 A1* | 2/2004 | Katata | 386/113 |
| 2004/0033059 A1* | 2/2004 | Kim et al. | 386/113 |
| 2004/0174785 A1 | 9/2004 | Ueda et al. | |
| 2004/0250160 A1* | 12/2004 | Kim et al. | 714/5 |
| 2004/0258400 A1* | 12/2004 | Yamaoka et al. | 386/113 |
| 2005/0007910 A1* | 1/2005 | Ito et al. | 369/47.14 |
| 2005/0030849 A1* | 2/2005 | Park | 369/47.14 |
| 2005/0270945 A1* | 12/2005 | Yoshida et al. | 369/53.17 |
| 2005/0281164 A1* | 12/2005 | Yoshida et al. | 369/53.17 |
| 2006/0156056 A1* | 7/2006 | Yoshida et al. | 714/5 |

FOREIGN PATENT DOCUMENTS

| | | |
|---|---|---|
| JP | 05-205447 A | 8/1993 |
| JP | 05-342817 A | 12/1993 |
| JP | 07-249270 A | 9/1995 |
| JP | 08-147702 A | 6/1996 |
| JP | 08-153376 A | 6/1996 |
| JP | 10-177769 A | 6/1998 |
| JP | 2001-266496 | 9/2001 |

\* cited by examiner

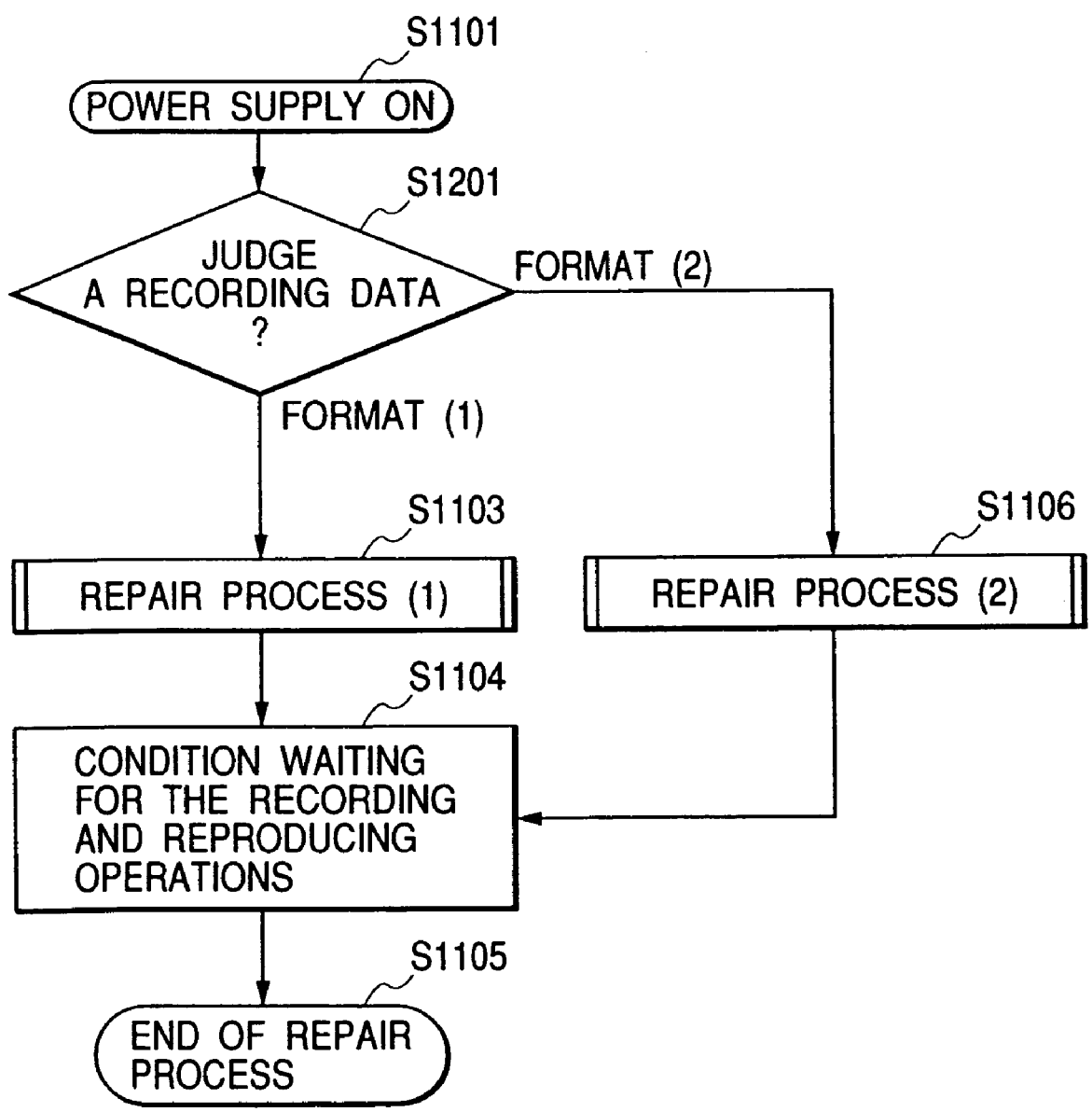

DATA RECORDING METHOD AND DATA RECORDING APPARATUS

BACKGROUND OF THE INVENTION

The present invention relates to a data recording technique for recording, to a recording medium, data such as video and audio data (AV data) (hereinafter, referred to as a user data) and a management data of such user data and reproducing such user data by utilizing the management data and particularly to a data recording technique for repairing an irregular event such as mismatch between recorded user data and management data or fault in user data or management data when such irregular event is generated due to an accidental failure of power supply.

With continuous improvement in the capacity of a recording medium such as an optical disc and a magneto-optical disc, investigation and development are dynamically progressed to a method and an apparatus for recording and rerecord of a user data through compression in amount of data of a digital signal. Particularly, in an apparatus for recording a user data on the real-time basis, if an accidental failure of power supply occurs, a mismatch is generated in a certain case between the recorded user data and management data or recording operation is suspended under the condition that a fault is generated in the user data or management data.

The technique for repairing the data on a recording medium under the condition explained above to realize again the monitor and additional record of data is described, for example, in the Japanese Unexamined Patent Publication 2001-266496 (hereinafter, referred to as official gazette 1).

SUMMARY OF THE INVENTION

The official gazette 1 discloses a technology that a non-volatile memory is mainly provided within a data recording apparatus to store therein a flag which indicates the recording condition and when supply power source is started again, the predetermined repairing operation is executed with reference to such flag. Moreover, the official gazette 1 also discloses a technique that recording and rerecord and repair are executed in the corresponding format to a recording medium which is basically allows rerecording operation such as deletion of user data and update by over recording of the management data.

However, when an accidental fault of power supply is generated during the recording operation in a data recording apparatus to execute the recording operation in the predetermined recording format, for example, to a recording medium which does not allow rerecording operation, any consideration has not yet been taken for repair process of recording data by paying attention to the recording medium which does not allow any rerecording operation. Moreover, for the data recording apparatus which can use both a recording medium which allows rerecording operation and a recording medium which does not allow rerecording operation, any particular consideration has not yet been taken for repair process of recorded data depending on a class of recording medium or recording format. Moreover, the data recording apparatus disclosed in the official gazette 1 has a problem that a structural element such as a non-volatile memory is required and thereby format control is complicated.

For example, when it is assumed that a user data is recorded to a DVD-R which is a recording medium allowing only once the recording operation on the real-time basis in the DVD video format used for an ordinary video disc which may be available in the market, the user data and management data must be finalized after the recording operation (hereinafter, called the finalization) depending on the DVD video format in order to watch the recorded data with a DVD player. If an accidental fault is generated in the power supply during the recording operation in such data recording apparatus which executes the recording operation explained above, when adequate repairing operation is not executed after the start of the successive supply of power source, not only reading and additional record of existing data but also finalization can no longer become impossible. As a result, it has been assumed that use of the disc will be impossible.

The present invention has been proposed considering the background explained above. Therefore, it is an object of the present invention to make it possible to execute again continuous operations such as monitor, additional record or finalization process of the recording data when an accidental fault is generated in the supply of power source during recording of data into a recording medium. Moreover, it is also an object of the present invention to lower a cost of apparatus and also simplify the control of a format.

In view of achieving the object explained above, a data recording technique of the present invention for recording a user data and a management data for management of such user data to a recording medium reads the latest management data stored in the recording medium, judges whether the latest management data contains a fault or not and compares, when it is judged that the latest management data does not includes a fault, compares a data size of the user data under the management of this latest management data with a data size of the user data recorded actually in the recording medium. When the latest management data cannot be read by the judgment explained above, or the latest management data is judged to include a fault or a data size of the user data under the management of the latest management data is judged to be mismatched from the data size of the user data recorded actually in the recording medium, the data recording technique updates the management data by analyzing the user data recorded in the recording medium.

BRIEF DESCRIPTION OF THE DRAWINGS

FIG. 12 is a diagram showing a schematic flow of the repairing operation in a fifth embodiment of the recording and reproducing apparatus of the present invention.

DETAILED DESCRIPTION OF THE PREFERRED EMBODIMENTS

Figure 1:
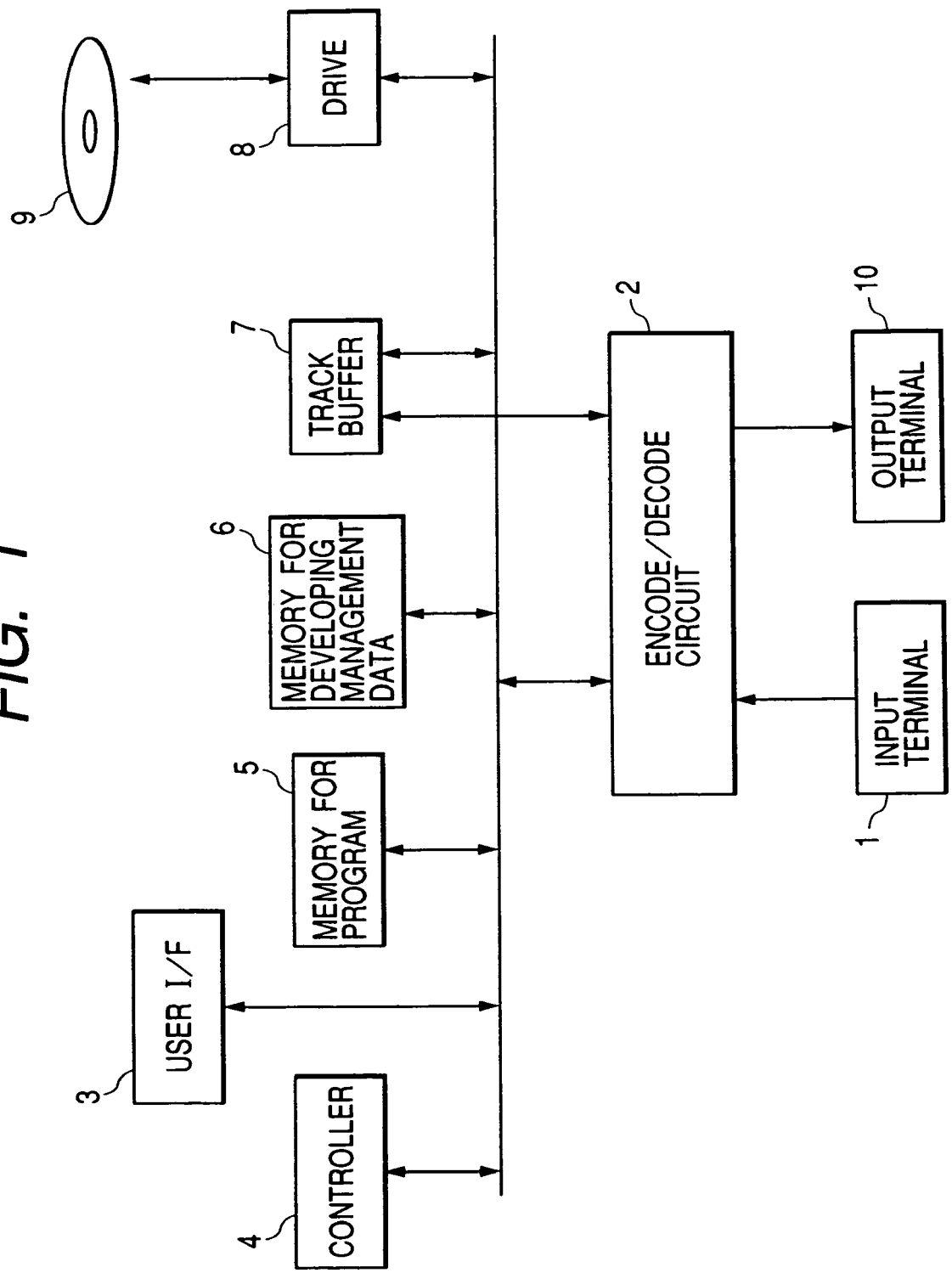
FIG. 1 is a block diagram showing a first embodiment of the recording and reproducing apparatus of the present invention.

The preferred embodiments of the present invention will be explained with reference to the accompanying drawings. FIG. 1 is a block diagram showing a first embodiment of the data recording apparatus of the present invention which enables, for example, the real-time recording of AV data using an optical disc which allows recording the data only once to an optical disc (non-rerecording disc). Hereinafter in this Detailed description, an optical disc is explained as a recording medium. In this embodiment, an AV data corresponds to a user data. The AV data is inputted via an input terminal 1. An encoding/decoding section 2 (hereinafter, referred to as a encode/decode circuit) encodes the AV data or decodes the encoded AV data. A data indicating an instruction of an operator is inputted via a user I/F 3, while a data for requesting an instruction to a user is outputted via the user I/F 3. A controller 4 controls operations of the apparatus as a whole. Operations of the controller 4 in this embodiment will be explained later. A memory for program 5 is used to memorize contents of control of the controller 4. A memory for developing of management data 6 is a non-volatile memory for temporarily storing an intermediate management data explained later. A track buffer 7 is a memory for absorbing a difference between a transfer rate of a drive 8 and an encoding rate of a stream data to be explained later. The drive 8 records a data to an optical disc 9 and reads a data therefrom. An AV data is outputted via an output terminal 10.

Prior to explanation of the recording and reproducing operation, a integral management data which is recorded to the optical disc 9 after the finalization and a recording format of the AV data will be explained with reference to FIG. 2 and FIG. 3. (finalization will be explained latter)

Figure 2:
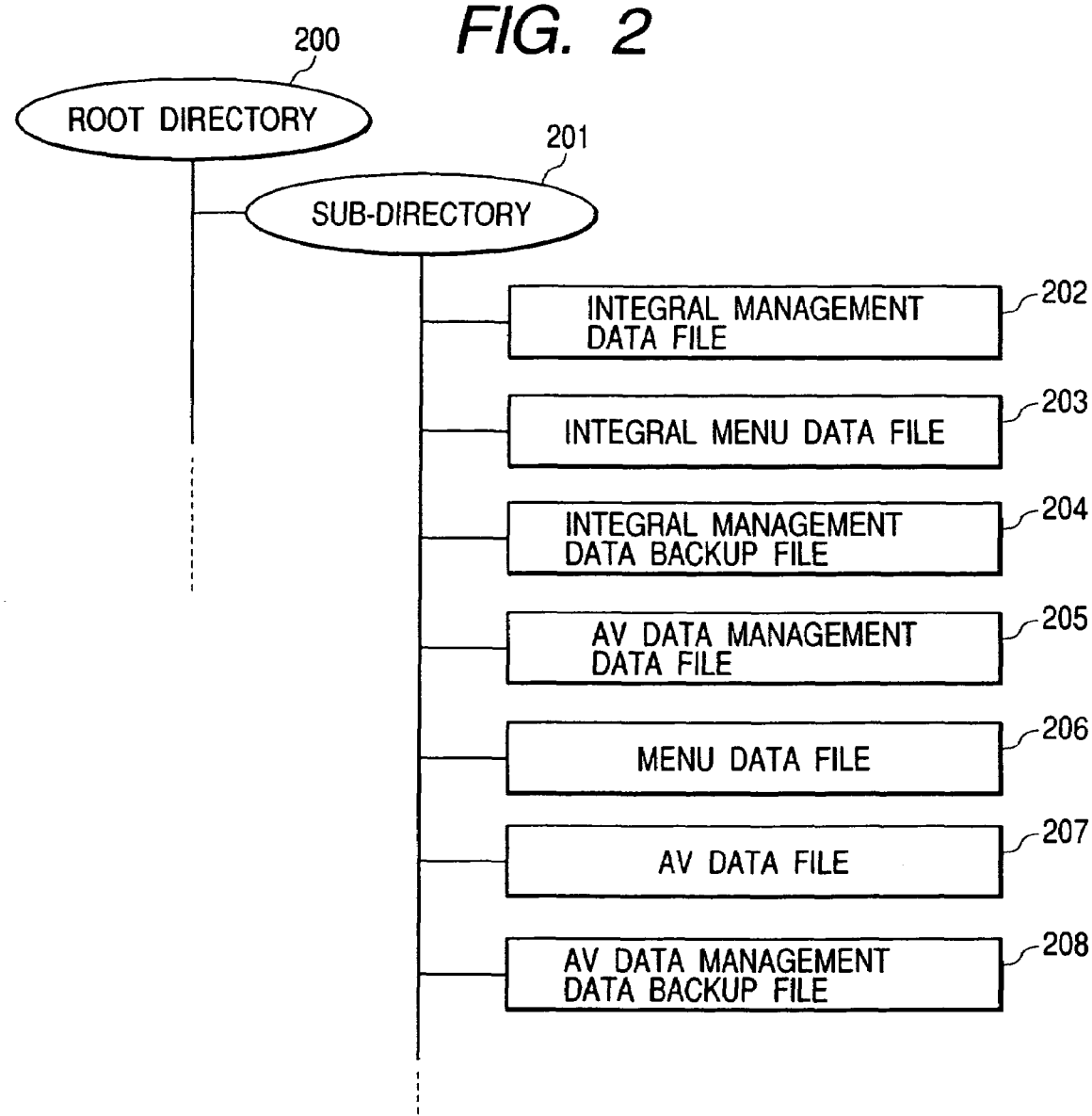
FIG. 2 is a diagram showing a directory structure of recording data. (after finalization)

FIG. 2 shows a directory structure after the finalization of the data to be recorded to the optical disc 9. In this embodiment, the directory structure conforms to the DVD video format, for example, as the format of the recording data. In this format, the video data is encoded by the MPEG Video format which is the international standards of the video encoding format, while the audio data is encoded by the adequate format such as MPEG Audio format or linear PCM format and both video data and audio data are multiplexed with the format conforming to the MPEG System format. In addition, in this format, it is requested that the management data which is perfectly matched with the AV data is recorded for the convenience of the reproducing operation.

In FIG. 2, a sub-directory 201 for DVD video is arranged under a root directory 200 and the management data file and AV data file generated are all disposed under the sub-directory 201. An integrated management data file 202 is used to record an integral management data for reproducing the AV data recorded and this integral management data also includes, for example, a reproducing sequence data. An integral menu data file 203 is an AV data file for integral menu display for reproduction and is recorded as the encoding data of the format same as that of an AV data file 207 explained later. In an integral management data backup file 204, the same content as the integral management data file 202 is recorded and this backup file 204 is used as the backup file when the data cannot be read from the integral management data file 202. An AV data management data file 205 is used to record in detail the AV data which is placed under the management in every unit among a plurality of units, while a menu data file 206 is used to record the AV data for menu display in every unit among a plurality of units as the encoding data of the same format as the AV data file 207 explained later. The AV data file 207 is used to record a stream data which is multiplexed by the MPEG format. In more practical, not only the video data and audio data but also the data for reproduction control and search data used for special reproduction are multiplexed as the AV data. An AV data management data backup filed 208 is used to record the same content as the AV data management data file 205 and is also used as the backup file when the data cannot be read from the AV data management data file 205.

These files are sequentially disposed toward the external circumference from the internal circumference in the form that not only it is enough to logically have the directory structure as the DVD video format but also the file sequence up to the upper file from the lower file in FIG. 2 is physically held on the optical disc 9. In the data recording apparatus for realizing the real-time recording, only the possible data which is required is generated on the real-time basis because it is difficult to generate all files on the real-time basis. The final generation of the other files including the filing of data which are generated on the real-time basis are executed at the time of finalizing operation. That is, the finalization has to be executed to equalizing the data format in order to reproduce the recorded data with a DVD reproducing apparatus which may be available at the market.

Figure 3:
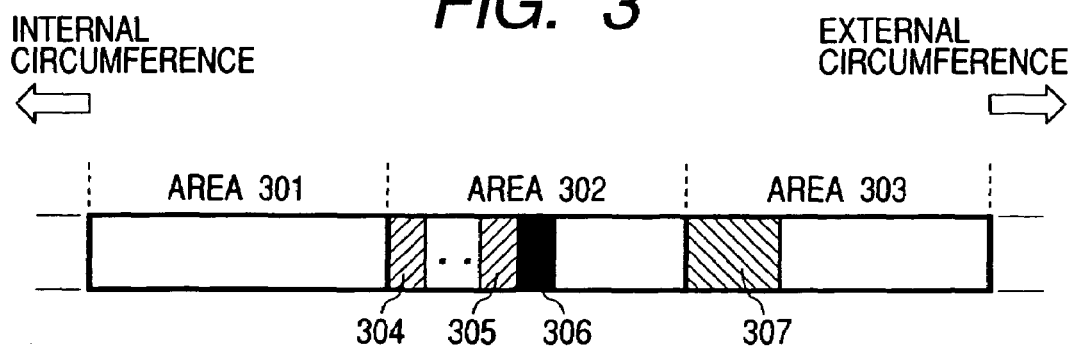
FIG. 3 is a diagram showing an example of a disc image.

FIG. 3 is a schematic diagram showing an image of disc of the optical disc before execution of the finalization as continuation of volumes. The left direction indicates the internal circumference of disc, while the right direction indicates the external circumference of disc. In order to record the data on the real-time basis, the volume space is structured previously to reserve three areas, namely the areas 301, 302 and 303.

As explained above, the filing of data is conducted at the time of finalization and only the necessary data is sequentially recorded on the optical disc 9 in the course of the recording before the finalization.

The stream data, which is finally filed as the AV data file 207 explained above, is recorded in the real-time to an optical disc. Moreover, a temporary management data to finally generate the integral management data file 202 and AV data management data 205 (hereinafter referred to as an intermediate management data) is updated on the real-time basis in the memory for development of management data (refer to FIG. 1) and the intermediate management data which has been updated in every end (or shut-off of the power supply) from the start of the single recording of the stream data is recorded to the optical disc. In FIG. 3, the data 304 to data 306 indicate the intermediate management data and particularly the data 306 is the latest (effective) intermediate management data, while the data 304 to data 305 are the (invalid) intermediate management data generated before data 306. One data unit corresponds to the end (or shut-off of the power supply) from the start of single recording operation. And the preceding intermediate management data is invalidated in every data unit because the optical disc 9 does not allow the rerecording operation and the latest intermediate management data is recorded to the optical disc 9 after the recording of stream data. Namely, the data which is in the outset in the area 302 can be recognized as the effective intermediate management data by sequentially arranging the intermediate management data from the starting position of the area 302. It is requested for convenience of process that the data unit of a single recording operation is set to 32 kByte size corresponding to the 1ECC block for error correction. Moreover, the data 307 is the stream data to generate the AV data file 207 at the time of finalization and the additional record is sequentially conducted to the optical disc 9, unlike the intermediate management data explained above.

At the time of finalization, a file format data is recorded to the area 301 for physically management of each file format and each file is generated and recorded to the area 302 and the successive areas based on the intermediate management data conforming to the file arrangement.

That is, the integral management data file 202, integral menu data file 203, integral management data backup file 204, AV data management data file 205 and menu data file 206 are respectively generated and are sequentially recorded to the areas after the area 302 where the intermediate management data is recorded. Moreover, the stream data in the area 303 is filed as the AV data file 207 explained above and the AV data management data backup file 208 is recorded to the successive areas. Physically, an invalid data is embedded for the alignment between respective files confirming to the partitioning of the ECC blocks. Moreover, in view of closing a disc, the Lead_in area is arranged and recorded at the internal circumference of the area 301, while the Lead_out area at the outer most external circumference of the area 303.

Here, the intermediate management data may be recorded to any area on the disc before the finalization. However, recording of the intermediate management data to the area 302 as shown in FIG. 3 is preferable from the following two reasons.

(1) When the intermediate management data is recorded to the area 302 in place of the other areas, the time required to seek the intermediate management data in order to generate the integral management data file or the like at the time of finalization can be so far reduced.

(2) When the intermediate management data is recorded to the area 302 in place of the other areas, amount of dummy data to be embedded to the area where the stream data is not recorded (hereinafter referred to as a vacant area) at the time of finalization can be reduced in the case where the finalization is conducted in such a stage that the amount of stream data is rather small and thereby the time required for the finalization can-also be reduced.

Namely, with a couple of reasons explained above, the time required for finalization can be reduced by recording the intermediate management data to the area 302 in place of the other areas. Therefore, in this embodiment, the intermediate management data is recorded to the area 302.

Under the conditions explained above, data recording operation will be explained first with reference to FIG. 1. The video data and audio data (AV data) inputted at the input terminal 1 are encoded with the predetermined encoding format explained above in the Encode/decode circuit 2. Thereby, amount of data is compressed and sequentially multiplexed. The stream data as the multiplexed AV data is once stored in the track buffer 7 to absorb a difference between the encoding rate and transfer rate of the drive 8 and to add a search data which is necessary at the time of reproduction. And this stream data is sequentially recorded additionally to the area 303 of the optical disc 9 with the drive 8 in every predetermined data unit. The controller 4 controls, based on an instruction input of a user via the user I/F 3, respective sections explained above, a program memory 5 explained later and the memory for developing of management data 6. As the control contents, the required contents are adequately loaded by recording and reading the data to and from the memory for program 5. The Encode/decide circuit 2 is integrated but this Encode/decode circuit 2 can also be realized in the composite structure in which a part of the encoding process is executed with the hardware, while the other operations up to the multiplexing are executed with the controller 4.

Moreover, the latest intermediate management data generated at the time of recording operation is once developed by the memory for developing of management data 6 and it is then updated simultaneously with recording of the stream data and this latest intermediate management data is recorded to the area 302 of the optical disc 9 when the recording of the stream data is ended (or when the power supply is shut off). In the case where the stream data is recorded first in the optical disc 9, an intermediate management data is newly generated and is developed into the memory 6 for development of the management data but when the stream data is additionally recorded to the optical disc 9 to which such stream data is already recorded in the past, the new intermediate management data is developed to the memory for developing of management data 6 after the latest intermediate management data is read from the optical disc 9.

Next, the reproducing operation will be explained. In FIG. 1, a stream data is read from the desired data position with the driver 8 from the area 303 of the optical disc 9 in the reverse flow of that during the recording operation explained above and is once accumulated in the track buffer 7. A difference between the transfer rate of the drive 8 and the encoding rate of stream data is absorbed and the video data and audio data of the AV data in the Encode/decode circuit 2 are isolated and decoded and are then outputted from the output terminal 10 in the adequate signal format.

Like the operations in the recording mode, the controller 4 controls each section explained above by loading the contents of memory for program 5 but the latest intermediate management data is read, as the reproducing operation, with the drive 8 from the area 302 of the optical disc 9 prior to the read operation of the stream data and the contents thereof are developed in the memory 6 for developing the management data. Instruction input by an operator inputted through the user I/F 3 is interpreted by the controller 4 and the reproducing operation is executed responding to the intermediate management data developed in the memory for developing of management data 6.

Here, consideration is taken for the case where an accidental shut-off of power supply is generated during the recording operation. In more practical, for example, when a data recording apparatus like a video camera is assumed, such shut-off condition corresponds to the case where a battery is accidentally disconnected to generate shut-off condition of power supply. If such condition is generated while the data recording is conducted to the optical disc 9 by the drive 8, it is probable that the recording of the intermediate management data 306 in FIG. 3 or stream data is completed under the imperfect condition. As a result, generated here is the situation that the intermediate management data 306 does not correctly reflect the contents of recording of the stream data 307.

Figure 4:
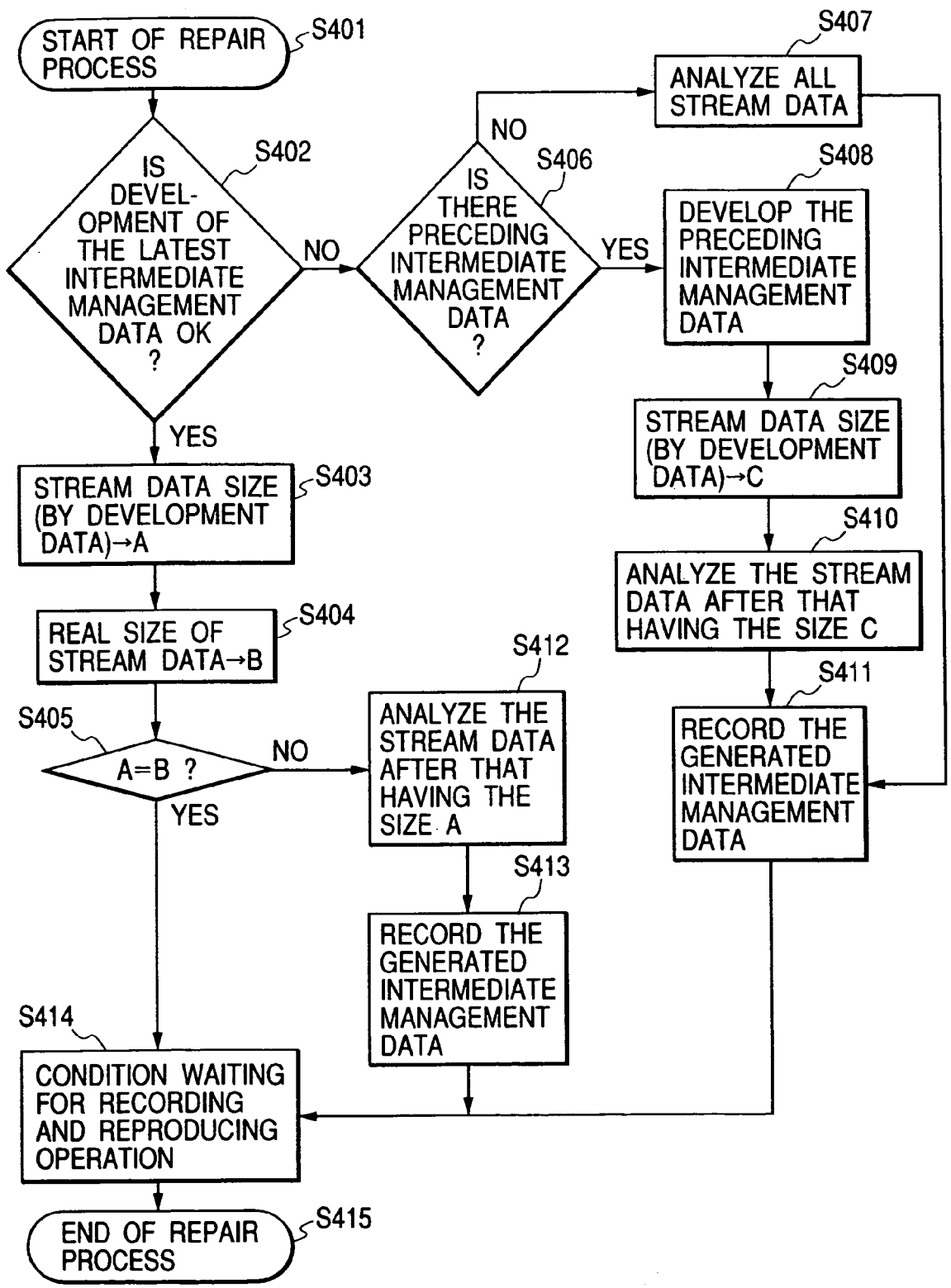
FIG. 4 is a diagram showing a schematic flow of the repairing operation in the first embodiment of the recording and reproducing apparatus of the present invention.
Figure 7:
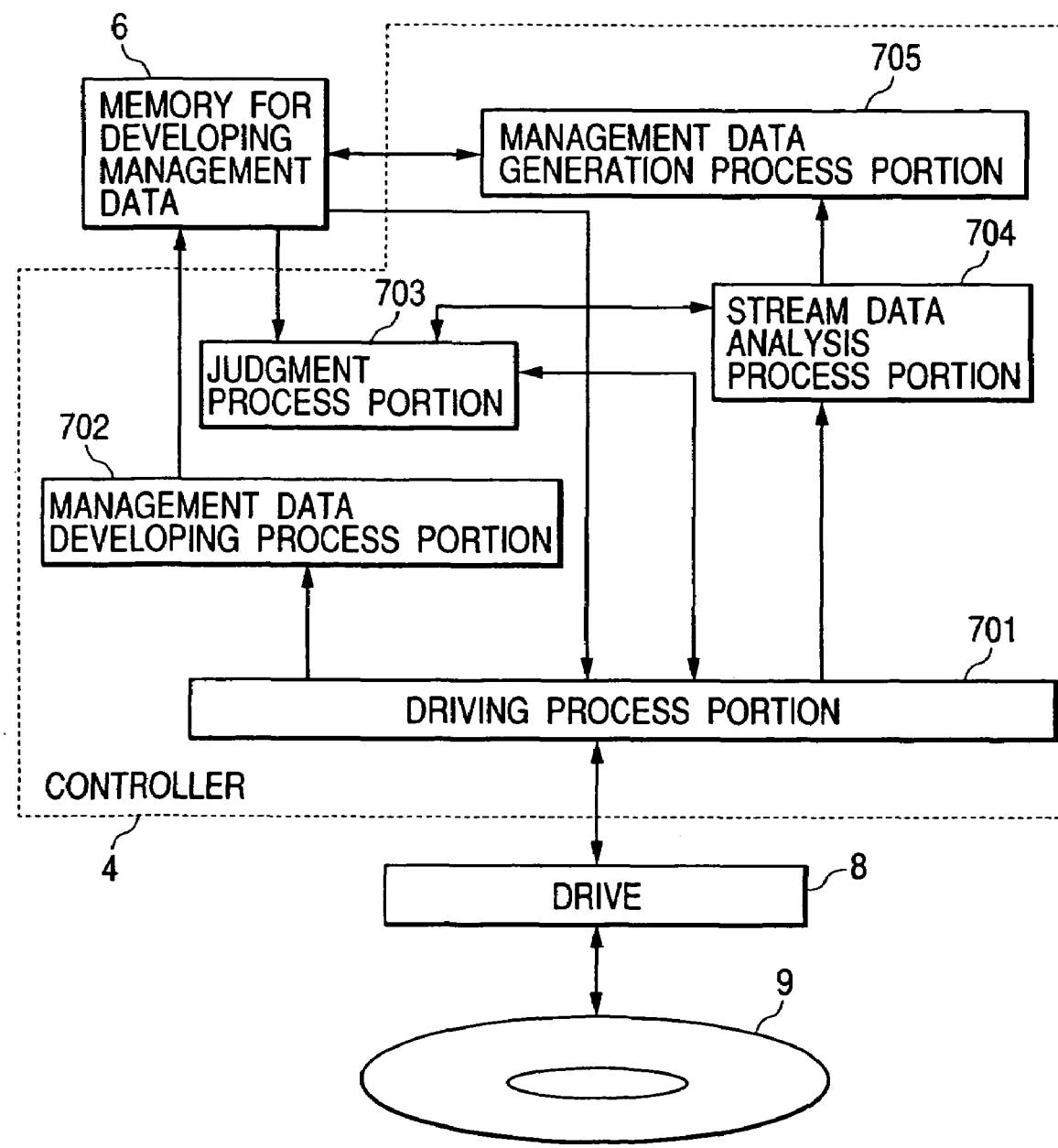
FIG. 7 is a block diagram of only a processing potion for repair process in the first embodiment of the data recording apparatus of the present invention.

Therefore, the repair process for the recording data in such a case will then be explained with reference to FIG. 4 and FIG. 7. FIG. 4 shows a schematic operation flow of the repair process. FIG. 7 is a function block diagram of the controller 4 in the repair process of the data recording apparatus shown in FIG. 1. In FIG. 7, the like elements as that of FIG. 1 are designated with the like reference numerals.

In the step S401, the repair process starts and the successive operations are carried out not only when the power switch is turned ON again after the accidental shut-off condition of power supply but also after the ordinary power supply ON operation is executed.

In the step S402, the drive 8 reads, under the control of the drive processing potion 701, the latest intermediate management data from the optical disc 9 and a management data developing process potion 702 develops, under the control of the drive processing potion 701, the latest intermediate management data read by the drive 8 to the memory for developing of management data 6. In this timing, a judgment processing potion 703 judges whether the latest intermediate management data can be adequately read by the drive 8 or not under the control of the drive processing potion 701. When it is judged that the latest intermediate management data cannot be read adequately, the process shifts to the step S406. Moreover, when the intermediate management data is read adequately, the judgment process potion 703 further judges whether a fault is generated or not in the intermediate management data developed in the memory for developing of management data 6. When the judgment potion 703 judges that any fault is not generated in the latest intermediate management data, the process shifts to the step S403. When the judgment potion 703 judges that a fault is generated in the latest intermediate management data, the process shifts to the step S406.

In the step S406, the judgment process potion 703 judges whether a preceding intermediate management data is recorded in the optical disc 9 or not. When the preceding intermediate management data is recorded, the process shifts to the step S408 and when the preceding intermediate management data is not recorded, the process shifts to the step S407.

Since the preceding intermediate management data is not recorded to the optical disc 9 in the step S407, the drive 8 reads all stream data recorded in the optical disc under the control of the drive process potion 701 and a stream data analysis process potion 704 analyzes the stream data read from the disc 9 under the control of the drive process potion 701. A management data generation process potion 705 generates an intermediate management data based on the result of analysis by the stream data analysis process potion 704 and develops a new intermediate management data to the memory for developing of management data 6.

In the step S408, the drive 8 read, since a fault is generated in the latest intermediate management data corresponding to the data 306 of FIG. 3, the data 305 as the preceding intermediate management data under the control of the drive process potion 701 and the management data developing process potion 702 develops the data 305 as the preceding intermediate management data read by the drive 8 into to memory for developing of management data 6 under the control of the drive process potion 701.

Subsequently, in the step S409, the judgment process potion 703 extracts a data size (=C) of the stream data under the management of the preceding intermediate management data developed in the memory for developing of management data 6.

In the step S410, the drive 8 reads the stream data after the data size C from the optical disc 9 under the control of the drive process potion 701, while the stream data analysis process potion 704 analyzes the stream data after the data size C read by the drive 8 under the control of the drive process potion 701.

The management data generation process potion 705 generates an intermediate management data based on the result analyzed by the stream data analysis process potion 704 and updates the intermediate management data developed in the memory for developing of management data 6.

Figure 5:
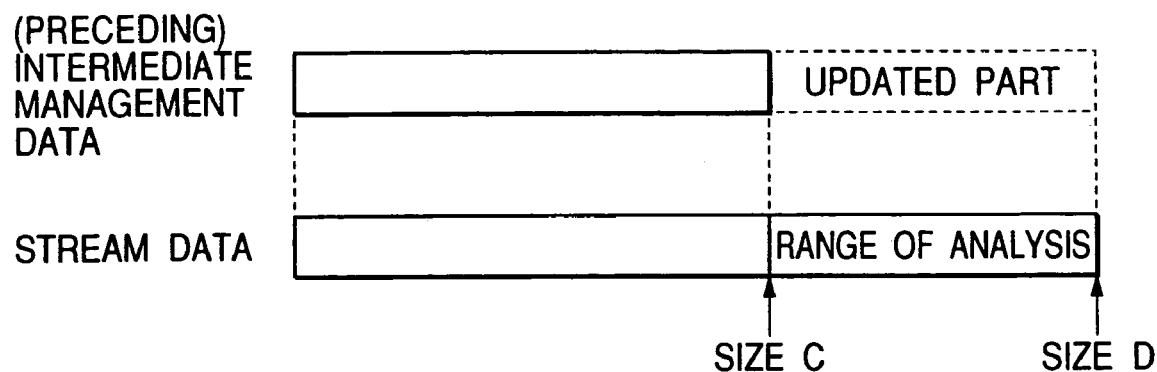
FIG. 5 is a diagram showing an example of recording data condition which requires repair.

A relationship between the intermediate management data and the stream data is shown in FIG. 5. Since the preceding management data is developed into the memory for developing of management data 6, the data size C of the stream data developed here becomes smaller than the data size D of the actual stream data.

Therefore, in the step S410, the stream data analysis process potion 704 analyzes the data up to the data size D at the end portion of the stream data from the data size C of the stream data, while the management data generation process potion 705 generates the intermediate management data based on the result of analysis by the stream data analysis process potion 704 to compensate for mismatch between the intermediate management data and stream data. Moreover, if a fault is generated in the stream data, the management data generation process potion 705 reflects this fact to the intermediate management data so that such defective part is not displayed during the reproducing operation.

When the update process in the step S410 is completed, the drive 8 records, in the step S411, the intermediate management data updated in the memory for developing of management data 6 into the area 302 of the optical disc 9 as the latest intermediate management data under the control of the drive process potion 701. When the recording operation explained above is completed, the recording and reproducing apparatus is set to the waiting condition in the step S414 and the repair process is completed in the step S415. The process in the step S411 that the updated intermediate management data is immediately recorded to the disc 9 has been explained but it is also possible that the recording to the optical disc 9 of the intermediate management data is conducted when the power supply is shut off after completion of the recording and reproducing operation after the condition to wait for the recording and reproducing operation in the step S414. That is, in the step S414, the stream data is further recorded to the optical disc 9 in the real-time mode, the intermediate management data is updated in the memory for developing of management data 6 and the intermediate management data further updated as explained above is then recorded to the optical disc 9 after the recording of the stream data.

Meanwhile, in the step S403, since latest intermediate management data has been developed in the memory for developing of management data 6 adequately in the step S402, the judgment process potion 703 extracts a data size (=A) of the stream data under the management of the latest intermediate management data developed in the memory for developing of management data 6.

Subsequently, in the step S404, the judgment process potion 703 extracts a data size (=B) of the actual stream data from the optical disc 9 via the drive 8 under the control of the drive process potion 701 and compares A and B in the step S405. When A=B, the condition to wait for the recording and reproducing operation is set in the step S414 under the assumption that the preceding shut-off condition of power supply is normally completed and the repair process is completed in the step S415. Moreover, when A ≠B is judged in the step S405, the process is shifted to the step S412 under the assumption that the preceding shut-off condition of power supply has been generated during the recording of stream data or has accidentally been generated immediately before the recording of intermediate management after the recording of the stream data.

In the step S412, the drive 8 reads the stream data after that having the size A from the optical disc 9 under the control of the drive process potion 701 and the stream data analysis process potion 704 analyzes the stream data read by the drive 8 under the control of the drive process potion 701. The management data generation potion 705 generates the intermediate management data based on the result analyzed by the stream data analysis process potion 704 and updates the intermediate management data developed in the memory for developing of management data 6.

Figure 6:
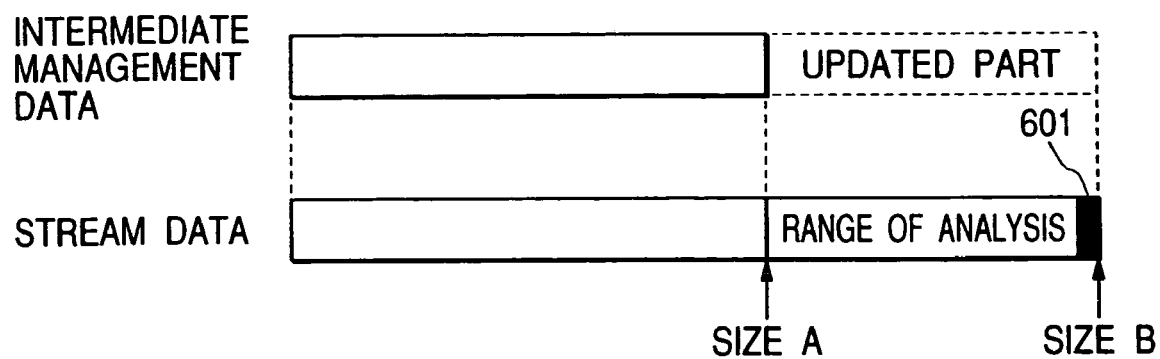
FIG. 6 is a diagram showing another example of recording condition which requires repair.

A relationship between the intermediate management data and stream data in this case is shown in FIG. 6. The data size A of the stream data which is managed by the intermediate management data becomes smaller than the data size B of the actual stream data. Therefore, in the step S412, the stream data analysis process potion 704 analyzes the stream data having the data size B up to the end part of the stream data from the stream data after that having the data size A. Thereby the management data generation process potion 705 updates the data by reflecting the contents on the intermediate management data in view of compensating for mismatch between the intermediate management data and the stream data. Moreover, if a preceding shut-off condition of power supply is generated during the recording operation of the stream data, it is probable at the end part 601 of the stream data that the recording is completed under the condition that the data format is imperfect. Therefore such condition is reflected on the intermediate management data so that such defective part is not displayed at the time of reproducing operation.

Upon completion of the update process in the step S412, the drive 8 records the intermediate management data updated in the memory for developing of management data 6 to the area 302 of the optical disc 9 as the latest intermediate management data under the control of the drive process potion 701 in the step S413. When the recording is completed, the repair process is completed in the step S415 through the condition to wait for the recording and reproducing operation in the step S414. In the step S413, the process to immediately record the updated intermediate management data to the optical disc 9 has been explained, but it is also possible to realize, like the step S411, the recording to the optical disc 9 when the supply of power source is shut-off after completion of the recording and reproducing operation through the condition to wait for the recording and reproducing operation in the step S414.

As explained above, according to the first embodiment, even if an accidental shut-off is just generated in the supply of power source, it is possible to execute the update process of the intermediate management data by obtaining a size of stream data from the intermediate management data and then comparing this stream data size with the size of stream data which is actually recorded. Owing to this structure, it is no longer required to provide a non-volatile memory within the data recording apparatus, record a flag indicating the recording condition to the non-volatile memory and execute the repair process with reference to this flag when supply of power source is started again. Moreover, since the intermediate management data is updated with analysis of stream data, repair process can be executed without recording of unwanted data to a read-only disc. Since the data having completed the repair process satisfies the predetermined format, successive operations such as additional record and completion process can be continued depending on the instruction input of an operator.

In this embodiment, the structure to execute the update process of the intermediate management data without any conditions depending on the result of comparison between the size of the stream data indicated in the intermediate management data and the actual size of the stream data has been explained above. However, it is also possible to provide a step to receive an instruction input of an operator before the update process of the intermediate management data and thereby the process is branched when the update process of the intermediate management data is executed immediately in this timing and not executed depending on such instruction input. However, when the update process of the intermediate management data is not executed immediately in this timing depending on the instruction input, it is required to provide a format to notify that a fault is generated in the data on the disc to an operator such as a display of an message output.

Next, as a second embodiment of the present invention, a practical repairing method will be explained by indicating an example of the contents in the case where the data format is imperfect at the end part of the stream data during the repair process explained above.

First, a recording format of the stream data will be explained with reference to FIG. 8.

Figure 8:
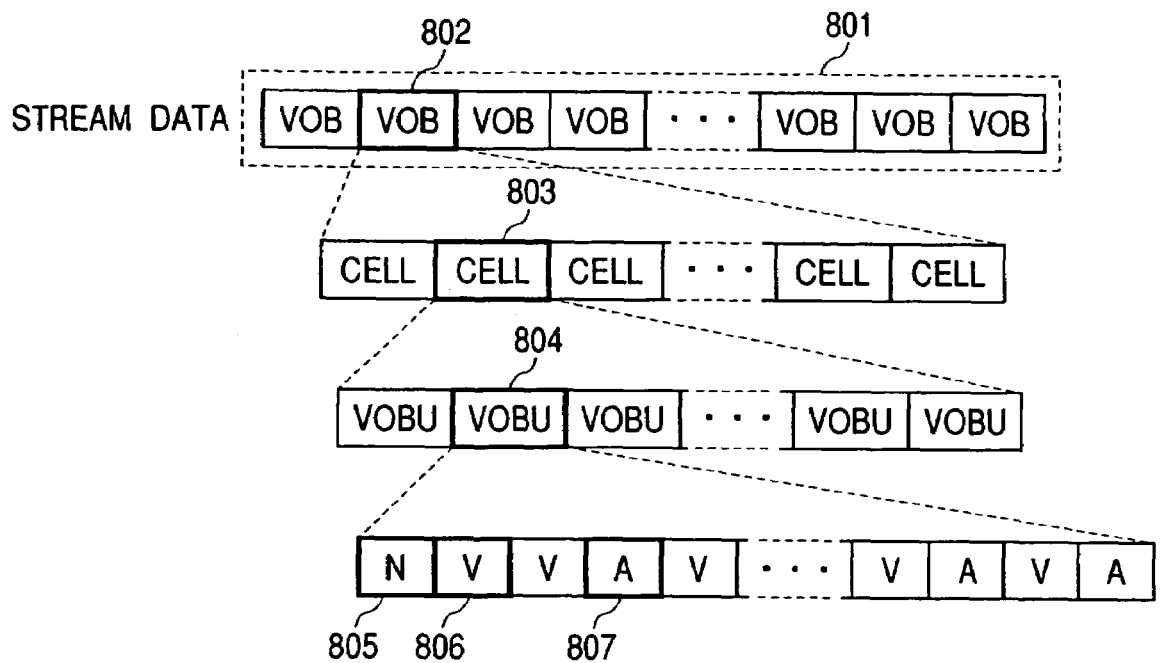
FIG. 8 is a diagram showing a management structure of a stream data and a data structure.

FIG. 8 shows an example of schematic format and management unit of the stream data recorded to the optical disc 9 conforming to the DVD video format. The stream data 801 is formed as a continuation of management unit called the VOB802 (Video Object). The VOB802 is formed as a continuation of management unit called the CELL 803 and this CELL 803 is formed as a continuation of management unit called the VOBU804 (VOBUnit). The VOB804 is the predetermined encoding unit depending on the MPEG Video format explained above and since it includes at least an I-picture, this management unit is used as a unit for special reproduction such as fast-feed or fast-return. Moreover, in the VOBU804, the navigation-pack 805 ("N" is given) including the data for reproduction control and data search data used for special reproduction is arranged first and subsequently, the adequate number of the video-packs 806 ("V" is given) including the video data and the audio-packs 807 ("A" is given) including the audio data are arranged in the multiplexed format through synchronization. The elements forming the VOBU804 also include a sub-picture pack in addition to three kinds of elements, but details of this element are not explained in this specification.

In the DVD video format explained above, it is required to describe the address data at the position isolated as much as about 240 VOBUs in maximum to the data search data included in the navigation-pack 805 with reference to the VOBU including the relevant pack. However, it is not required to describe the data search data over the several CELLs and it is enough, for example, that only the address data of the VOBU included in the CELL803 is reflected on the data search data of the navigation-pack 805. Namely, here is introduced a method, in order to record the stream data while the navigation-pack is inserted on the real-time basis, that the data is recorded to the optical disc 9 in unit of CELL by once storing data enough for generation of CELL in the track buffer 7 and generating and inserting the navigation-pack while the data search data is calculated within the range of such data.

Figure 9:
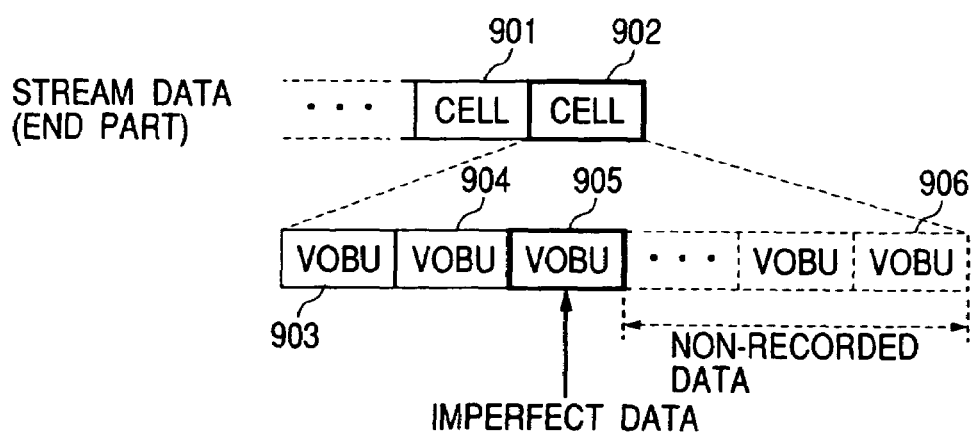
FIG. 9 is a diagram showing an example of the recording condition of the stream data in a second embodiment of the recording and reproducing apparatus of the present invention.

FIG. 9 shows an example of the case where the data format has become imperfect at the end part of the stream data due to an accidental shut-off of the supply of power source during the recording of the stream data. From the point of view of management unit, the data is perfectly recorded up to the CELL 901 from the beginning of stream data, but the recording is interrupted in the course of recording operation of CELL 902 because of generation of shut-off condition of supply of power source. That is, FIG. 9 shows the condition that the recording of VOBU903, VOBU904 has been completed accurately, the recording operation is interrupted in the course of VOBU905 and subsequently the data to be recorded of the management units up to the VOBU906 is not recorded.

When a repair process is executed for the stream data in this condition, it can be known by the analysis of stream data that the imperfect data is recorded in the VOBU905. As the repair process, it is reflected on the intermediate management data that the recording of data of CELL 902 is assumed to be completed at the unit VOBU905. However, since the VOBU905 is imperfect as the encoding unit, it is reflected on the intermediate management data that display is not executed during the reproducing operation. Since the data search data of the units up to the VOBU906 is already inserted and stored into the navigation-packs included in the VOBU903 and VOBU904, incorrect operation will probably be generated during the reproducing operation using the data search data other than the ordinary reproducing operation but it satisfies the format of the recording data, the additional record of data can be continued without any problem. When it is requested to perfectly control the possibility for such incorrect operation during the reproducing operation using the data search data, it can be realized by reflecting on the intermediate management data that the CELL902 itself is not reproduced.

As explained above, according to the second embodiment of the present invention, even when the recording of stream data is completed in the imperfect condition, it is possible to satisfy the format as the recording data and execute the operation continuously by reflecting it on the intermediate management data that display of the relevant small unit is not conducted in the update process of the intermediate management data.

Figure 10:
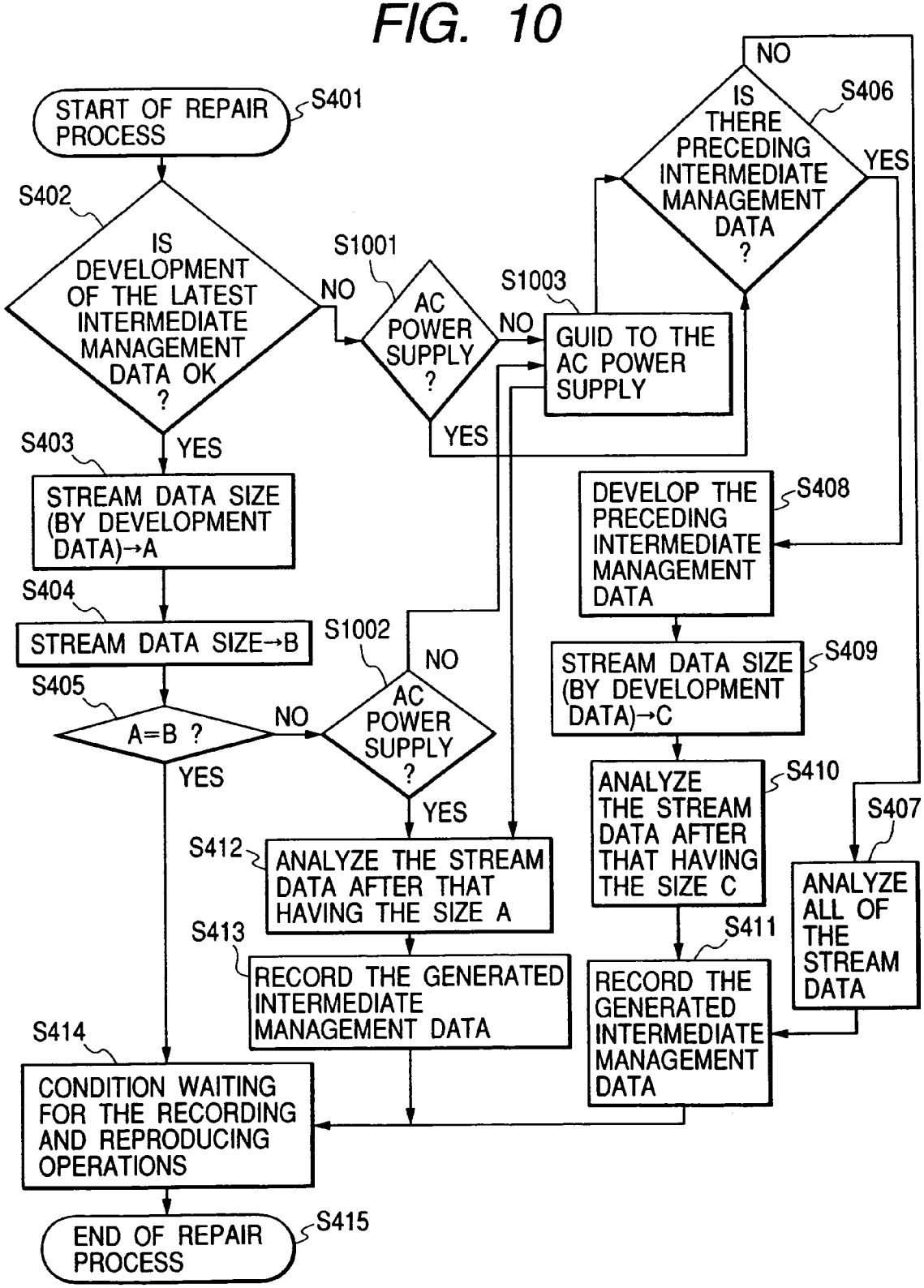
FIG. 10 is a diagram showing a schematic flow of the repairing operation in a third embodiment of the recording and reproducing apparatus of the present invention.

FIG. 10 is a flow diagram for explaining a third embodiment of the data recording apparatus of the present invention. This flow diagram shows a schematic operation of the repair process. The part like those in FIG. 4 will be designated with the like reference numerals and details of these portions are not explained here.

In this third embodiment, the steps S1001, S1002 and step S1003 are newly added. These steps are mainly executed in the former half of the repair process. As explained above, after the power of the data recording apparatus is turned ON, when read or development of the latest intermediate management data from the optical disc 9 is judged to be incorrect in the step S402, whether the supply of power is the AC power supply or not is judged in the step S1001. When the power supply is the AC power source, the repair-process after the step S406 is executed like the embodiments explained above. If the power supply is not the AC power source, namely if the power source is supplied from a battery, for example, of a camera type data recording apparatus, a guiding process to the AC power source is executed in the step S1003. This process is necessary to lower the probability as much as possible for generation of shut-off condition of power source due to insufficient capacity of battery or disconnection of battery during the process which is assumed to be generated when the repair process is executed under the condition that the power source is supplied from the battery. After an operator has executed a preventive process such as change of power supply potion responding to the guiding process in the step S1003, the process shifts to the step S406.

In the same manner, when the data size A of the stream data under the management of the intermediate management data and the data size B of the stream data recorded in the disc 9 are judged to be different from each other in the step S405 explained above, whether the power supply is the AC power source or not is judged in the step S1002. When the power supply is the AC power source, the repair process of the step S412 and successive steps are executed. When the power supply is not the AC power source, a guiding process to the AC power source is also executed in the step S1003 as explained above. After an operator has conducted the preventive process such as change of the power supply potion, the process shifts to the step S412. The guiding process is enough when at least the contents thereof can be recognized by an operator as represented, for example, by a display of message notifying that switching to the AC power supply is requested because the update process of the intermediate management data is necessary.

In this embodiment, a structure for executing the update process of the intermediate management data without any condition when it is judged that the AC power source is used has been explained, but it is also possible, like the first embodiment, that the step for requesting an instruction input of an operator before the update process of the intermediate management data is conducted is provided and thereby the process is branched here depending on the instruction input to the case where the update process of the intermediate management data is executed and the case where such update process is not executed. However, in the case where the update process of the intermediate management data is not executed in this timing depending on the instruction input of an operator, it is also requested to provide a format to notify that a fault is generated in the data on the disc to an operator, for example, by displaying a message output as explained above.

Whether the power supply is the AC power source or not can be judged whenever before the update process of the intermediate management data is executed. For example, such judgment can be executed immediately after the power is turned ON or before the repair process is started.

As explained above, according to the third embodiment, the step for judging Whether the power supply is the AC power source or not is provided before execution of the update process of the intermediate management data, and when the AC power source is not used, shut-off condition of power supply due to insufficient capacity of battery or disconnection of battery during update process of the intermediate management data can be eliminated by conducting the guiding process to the AC power source.

Figure 11:
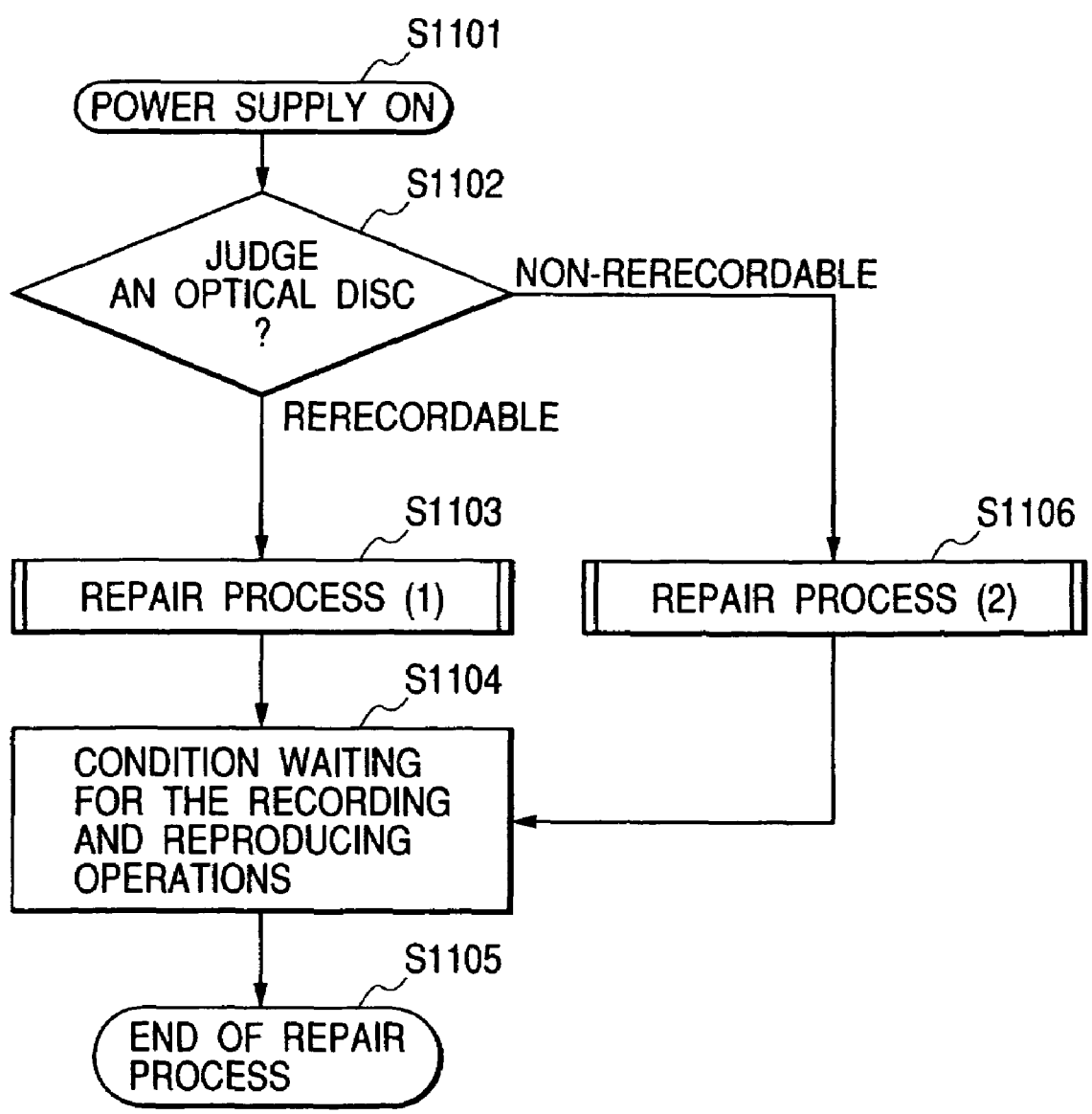
FIG. 11 is a diagram showing a schematic flow of the repairing operation in a fourth embodiment of the recording and reproducing apparatus of the present invention.

Next, a fourth embodiment of the data recording apparatus of the present invention will be explained with reference to FIG. 11. In the embodiments explained above, an optical disc, which allows recording only once (non-rerecordable disc) is used as an optical disc. However, it is also possible for the data recording apparatus to selectively use an optical disc which allows a plurality of times of recording operation (rerecordable disc) corresponding to the drive 8 shown in FIG. 1. FIG. 11 shows an example of the schematic operations of the repair process in the data recording apparatus which can selectively use the rerecordable disc and non-rerecordable disc. Here, it is assumed for the rerecordable optical disc that the data recording is executed in the recording format (hereinafter, referred to as format (1)) adaptive to the rerecordable disc which is described in the reference 1 and it is also assumed for the non-rerecordable optical disc that the data recording is executed in the recording format (hereinafter, referred to as format (2)) which provides the recording data of the format conforming to the final DVD video format as explained in the embodiments explained above.

When the power is turned ON first (step S1101), a class of optical disc is judged in the step S1102. When the optical disc is judged as the rerecordable optical disc, the repair process (hereinafter referred to as the repair process (1) corresponding to the format (1) described in the reference 1 is executed in the step S1103. Moreover, when the optical disc is judged as the non-rerecordable optical disc, the repair process corresponding to the format (2) (hereinafter referred to as the repair process (2)) as explained above is executed. When one of these repair processes is completed, the apparatus enters the condition waiting for the recording and reproducing operations in the step S1104 and thereafter the apparatus completes the repair process in the step S1105. In regard to the method for judging the optical disc, any one which can attain the data to judge the optical disc, for example, by checking the optical disc class data previously stored in the optical disc or by judging physical difference of the optical disc with the data reading potion of the drive 8 may be used.

As explained above, according to the fourth embodiment of the present invention, the repair process can be executed corresponding to respective recording data of the optical disc by judging the optical disc after the power is turned ON and sharing the repair process. Thereby, the subsequent operations such as watching of video data and additional data record can be executed continuously.

Next, a fifth embodiment of the data recording apparatus of the present invention will be explained with reference to FIG. 12. The portions like those of FIG. 11 are designated with the like reference numbers. In this embodiment, an example of schematic operations of the data recording apparatus which may selectively use the rerecordable optical disc and non-rerecordable optical disc as in the case of the fourth embodiment explained above is explained. However, in this embodiment, the data recording is possible in the format (2) for the rerecordable optical disc.

When the power is turned ON (step S1101), the data format recorded in the optical disc is judged in the step S1201. When the recording data is judged as recorded in the format (1), the repair process (1) is conducted in the step S1103. Moreover, when the recording data is judged as recorded in the format (2), the repair process (2) is conducted. When the repair process (1) or (2) is completed, the apparatus enters the condition waiting for the recording and reproducing operation in the step S1104 and the repair process is completed in the step S1105. The recording data judging operation can be realized depending on whether the recording data is filed or not or by acquiring a file name and there is no limitation on the recording data judging method.

As explained above, according to the fifth embodiment of the present invention, the repair process can be executed corresponding to the respective recording data format independent of the optical disc by judging the recording data format after the power is turned ON and by sharing the repair process. As a result, subsequent operations such as watching of video data and additional record of data can be realized continuously.

In above embodiments, a portable camera type data recording apparatus has been used as an example, but contents of the present invention is not limited thereto and the present invention can also be adapted to a stationary type data recording apparatus in which the power source voltage is supplied through the indoor power supply wiring. However, in this case, the guiding process to the AC power source explained in the third embodiment is no longer required.

Moreover, in the embodiments explained above, an optical disc has been used as the recording medium, but any type of medium such as a magnetic disc and a semiconductor memory or the like can be used when data can be recorded therein in the predetermined format on the real-time basis.

In addition, a detail analysis method of the stream data has not yet been explained in above embodiments but considerable degree of freedom are given to the analysis level, for example, that the analysis is executed in unit of the encoding unit such as video-pack or audio-pack or the analysis is executed in more detail for all Huffman codes after the pictures of the video data.

Furthermore, in above embodiments, the AV data is recorded to the data recording apparatus, but the technique of the present invention may also be used for a user data such as a program data or the like other than the AV data.

As explained above, according to the present invention, even if an accidental shut-off condition occurs in the supply of power source voltage during the recording of data into an optical disc based on the data recording technique for recording, to an optical disc, a user data and a management data used for management of user data, operations such as watching of the recording data, additional record of data or the completion process can be conducted continuously. In addition, since a non-volatile memory is unnecessary, cost of apparatus can be lowered and format control can also be simplified.

What is claimed is:

1. A data recording method for recording stream data and management data used for management of said stream data into a recording medium which does not allow a rerecording operation, said recording medium having at least a first predefined area, a second predefined area, and a third predefined area arranged beginning from an inner circumference thereof, the method comprising:

a first step of recording first stream data onto said third predefined area, and recording first intermediate management data for management of said first stream data onto said second predefined area, wherein said first intermediate management data manages said first data stream prior to a finalization operation;

subsequent to said first step, a second step of recording second stream data onto said third predefined area, and recording second intermediate management data for management of said first stream data and said second stream data onto said second predefined area, wherein said second intermediate management data manages said first stream data and said second stream data prior to said finalization operation; and a third step of reading said first intermediate management data when a fault occurs in said second intermediate management data.

2. The data recording method according to claim 1, further comprising a fourth step of analyzing data that is managed by said first intermediate management data and which is recorded on said recording medium to determine a data size thereof, generating third intermediate management data based on a result of analysis of said data, and recording said third management intermediate data onto said recording medium.

3. The data recording method according to claim 1, wherein said fault constitutes a mismatch between a data size indication contained in said second intermediate management data of data that is managed by said second intermediate management data and the size of said data as it is actually recorded on said recording medium.

4. The data recording method according to claim 3, further comprising a fourth step of analyzing stream data that is managed by said first intermediate management data and which is recorded on said recording medium to determine a data size thereof, generating third intermediate management data based on a result of analysis of said stream data and recording said third intermediate management data onto said recording medium.

5. The data recording method according to claim 4, wherein said stream data is image data from a video camera.

6. The data recording method according to claim 4, wherein when it is determined in said third step that a part of said recording medium on which said second stream data is recorded defective, then said third intermediate management data includes information indicating that said defective part is not to be reproduced in a reproduction operation.

7. A data recording method for recording stream data and management data used for management of said stream data into a recording medium which does not allow rerecording operations, said recording medium having at least a first predefined area, a second predefined area, and a third predefined area arranged beginning from an inner circumference thereof, the method comprising:
a first step of recording first stream data onto said third predefined area, and recording first intermediate management data for management of said first stream data onto said second predefined area, wherein said first intermediate management data manages said first stream data prior to a finalization operation;
subsequent to said first step, a second step of recording second stream data onto said third predefined area, and recording second intermediate management data for management of said first stream data and said second stream data onto said second predefined area, wherein said second intermediate management data manages said first stream data and said second stream data prior to said finalization operation; and
a third step of reading said first intermediate management data when said second intermediate management data as recorded in said recording medium in said second step is not read.

8. The data recording method according to claim 7, further comprising a fourth step of analyzing data that is managed by said first intermediate management data and which is recorded on said recording medium to determine a data size thereof, generating third intermediate management data based on a result of analysis of said data, and recording said third management intermediate data onto said recording medium.

9. The data recording method according to claim 8, wherein said stream data is image data from a video camera.

10. The data recording method according to claim 9, wherein when it is determined in said third step that a part of said recording medium on which said second stream data is recorded defective, then said third intermediate management data includes information indicating that said defective part is not to be reproduced in a reproduction operation.

11. A data recording apparatus for recording stream data and management data used for management of said stream data onto a recording medium which does not allow a rerecording operation, said recording medium having at least a first predefined area, a second predefined area, and a third predefined area arranged beginning from an inner circumference thereof, the data recording apparatus comprising:
a management data generator configured to generate first intermediate management data and second intermediate management data based on said stream data, wherein said first intermediate management data manages first stream data prior to finalization and said second intermediate management data manages second stream data prior to finalization;
a data recorder configured to record at least one of said first stream data or said second stream data onto said third predefined area, said data recorder further configured to record at least one of said first intermediate management data or said second intermediate management data onto said second predefined area; and
a data reproducer configured to read said first intermediate management data when a fault is in said second intermediate management data recorded onto said recording medium.

12. The data recording apparatus according to claim 11, further comprising a stream data analyzer configured to analyze stream data managed by said first intermediate management data to determine a data size of said stream data,
wherein said management data generator generates third intermediate management data based on a result of analysis of said stream data,
said third intermediate management data being recorded onto said recording medium by said data recorder.

13. The data recording apparatus according to claim 11, wherein said fault comprises a mismatch between a data size indication contained in said second intermediate management data of data that is managed by said second intermediate management data and the size of said data as it is actually recorded on said recording medium.

14. The data recording apparatus according to claim 13, further comprising a stream data analyzer configured to analyze stream data analyzing stream data that is managed by said first intermediate management data and which is recorded on said recording medium to determine a data size thereof,
wherein said management data generator generates third intermediate management data based on a result of analysis of said stream data,
said third intermediate management data being recorded onto said recording medium by said data recorder.

15. The data recording apparatus according to claim 14, wherein said stream data is image data taken by a video camera.

16. The data recording apparatus according to claim 15, wherein when it is determined in said third step that a part of said recording medium on which said second stream data is recorded defective, then said third intermediate management data produced by said management data generator includes information indicating that said defective part is not to be reproduced in a reproduction operation.

17. A data recording apparatus for recording stream data and management data used for management of said stream data onto a recording medium which does not allow rerecording operation, said recording medium having a first predefined area, a second predefined area, and a third predefined area sequentially arranged beginning from an inner circumference thereof, the data recording apparatus comprising:

a management data generator configured to generate first intermediate management data and second intermediate management data based on said stream data, wherein said first intermediate management data manages first stream data prior to finalization and said second intermediate management data manages said first stream data and second stream data prior to finalization;

a data recorder configured to record at least one of said first stream data or said second stream data onto said third predefined area, said data recorder further configured to record said first intermediate management data onto said second predefined area and said first stream data and said second intermediate management data onto said second predefined area; and a data reproducer configured to read said first intermediate management data when said second intermediate management data recorded onto said recording medium is not read.

18. The data recording apparatus according to claim 17, further comprising a stream data analyzer configured to analyze stream data managed by said first intermediate management data to determine a data size of said stream data, wherein said management data generator generates third intermediate management data based on a result of analysis of said stream data, said third intermediate management data being recorded onto said recording medium by said data recorder.

19. The data recording apparatus according to claim 18, wherein said stream data is image data taken by video camera.

20. The data recording apparatus according to claim 19, wherein when it is determined in said third step that a part of said recording medium on which said second stream data is recorded defective, then said third intermediate management data produced by said management data generator includes information indicating that said defective part is not to be reproduced in a reproduction operation.

* * * * *